United States Patent [19]

Chapiro et al.

[11] 4,005,059
[45] Jan. 25, 1977

[54] COPOLYMER OF N-VINYLCARBAZOLE

[75] Inventors: Adolphe Chapiro, Gif sur Yvette; Zbigniew Mankowski, Paris, both of France

[73] Assignee: Agence Nationale de Valorisation de la Recherche (ANVAR), Neuilly, France

[22] Filed: Apr. 30, 1974

[21] Appl. No.: 465,639

[30] Foreign Application Priority Data

May 3, 1973 France .............................. 73.15931

[52] U.S. Cl. .......................... 526/259; 204/159.22; 428/461; 526/23; 526/47
[51] Int. Cl.$^2$ ............... C08F 220/06; C08F 226/12
[58] Field of Search ............ 260/80.3 R; 450/723.5

[56] References Cited

UNITED STATES PATENTS 2,072,465  3/1937  Reppe et al. ........................... 260/2

FOREIGN PATENTS OR APPLICATIONS 664,231  8/1938  Germany .......................... 260/80.3

Primary Examiner—Stanford M. Levin
Attorney, Agent, or Firm—Burgess, Dinklage & Sprung

[57] ABSTRACT

There is described a novel copolymer comprising approximately equimolar proportions of N-vinylcarbazole and a copolymerisable ethylenically unsaturated carboxylic acid such as acrylic acid or methacrylic acid, which can be prepared by mixing the monomers in a wide range of relative proportions, alone or diluted in a solvent, and initiating copolymerisation by methods known to the art, and which can be cross-linked, e.g. by means of polyvalent metal cations; this cross-linking is reversible on treatment with strong acid. The copolymer has good thermal and mechanical properties and adhesive properties, e.g. for metals, and can be used to form protective coatings on metals and to form metal and metal/plastics laminates.

3 Claims, No Drawings

COPOLYMER OF N-VINYLCARBAZOLE

This invention relates to a new material, namely a copolymer of N-vinylcarbazole and a polymerisable ethylenecarboxylic acid, with a 50/50 molar apportionment (to within about 5%) of its constituents.

It also relates to a process for manufacturing this material and to the finished or semi-finished products, such as in particular coatings or sheets, formed with the aid of such a material, and structures (coated products, laminates, etc.) comprising these products.

The novel material has a good temperature stability comparable to that of poly(N-vinylcarbazole), which is a vitreous polymer the transition point of which is of the order of 180° to 250° C.

It moreover exhibits good mechanical properties and interesting adhesive properties, in particular in relation to metals, due to its many carboxylic functions.

Thus, it is possible to form with this material:

protective anti-corrosion, rust-preventive, etc., coatings for metal or other parts which, in the absence of such coatings, would run the risk of deteriorating by oxidation, wetting or for any other reason, laminates, "sandwiches" or other laminated metal-to-plastic structures formed of at least two juxtaposed sheets consisting respectively of a metal or alloy and of the material in question.

The said material can moreover be cross-linked with the aid of polyvalent metallic ions ($Ca^{2+}$, $Ba^{2+}$, $Fe^{2+}$, $Fe^{3+}$, etc.): such a reticulation is interesting in that it is reversible, it being possible for the carboxylic groups to be liberated again by a strong acid.

To manufacture such a compound, N-vinylcarbazole is copolymerised with a polymerisable ethylenecarboxylic acid such as acrylic acid or methacrylic acid.

This copolymerisation can be performed on a pure mixture of the two monomers or on a solution of this mixture; it can be carried out at room temperature or at temperatures higher or lower than room temperature.

The said copolymerisation can be started by the usual methods which result in the generation of free radicals: it is thus possible to use chemical initiators such as, for example, peroxides or azo compounds, or again irradiation with actinic light or high-energy radiation (such as, in particular, X rays, gamma rays, accelerated electrons).

In carrying out a series of copolymerication operations under the above-indicated conditions, the inventors have made the following unexpected discovery: whatever the said conditions, and in particular whatever the respective percentages of the two monomers in the treated mixture, and even if these percentages vary within wide limits (it being possible for the molar percentage of each monomer to be between 1 and 99%, and preferably between 5 and 95%, of the total of the two monomers), the copolymer obtained always contains, to within about 5%, 50% of elements of each monomer.

The explanation of the phenomenon observed, which for the moment is only a working hypothesis, is that the N-vinylcarbazole, a monomer of a basic nature, combines with the carboxylic monomer, which is of an acid nature, to form a molecular complex and that the copolymerisation of this complex results in a macromolecular chain in which the two monomeric elements, the carbazole and carboxylic elements, respectively, alternate regularly.

The constancy of the composition of the copolymer for monomer baths of different concentrations constitutes an important technical advantage, because it enables the reaction to be conducted to high levels of conversion without modifying the composition of the product formed and even if one of the two monomers of the starting mixture available for the copolymerisation reaction is exhausted more quickly than the other.

Examples of the manufacture of the above-described copolymer are given hereinafter. In each of these examples, the reaction mixture, composed of the two monomers with or without an added solvent, is introduced into a glass ampoule. This mixture is degassed under vacuum and then the ampoule is sealed under vacuum and is exposed to the gamma rays of a cobalt 60 source with an intensity of 23 rads per minute. After the irradiation, the copolymer formed is separated from the residual monomers, dried under vacuum and weighed. Its composition is determined by microdetermination of the nitrogen, infra-red analysis and titration of the COOH groups.

EXAMPLE 1

The two starting monomers are intermixed directly without added solvent. The temperature is 20° C. The results of the treatment conducted under these conditions are recorded in the following Table:

| Weights of the monomers | | | Copolymer formed | | |
|---|---|---|---|---|---|
| Acrylic acid (g) | N-vinylcarbazole (g) | Time of irradiation in hours | Weight (g) | % conversion | Composition (% of NVC in mols) |
| 1.381 | 3.706 | 0.5 | 0.681 | 13.4 | 51.3 |
| 1.381 | 3.706 | 1.0 | 1.046 | 20.6 | 49.4 |

EXAMPLE 2

The two starting monomers are mixed in solution in toluene at 20° C. The results of the treatment are recorded in the following Table:

| Weights of the monomers | | | | Copolymer formed | | |
|---|---|---|---|---|---|---|
| Acrylic acid (g) | N-vinyl-carbazole (g) | Volume of toluene (cc) | Time of irradiation in hours | Weight (g) | % conversion | Composition (% of NVC in mols) |
| 2.018 | 2.983 | 7.1 | 1 | 0.124 | 2.5 | 43.7 |
| 2.018 | 2.985 | " | 3 | 0.620 | 12.4 | 44.9 |
| 1.381 | 3.706 | " | 1 | 0.101 | 2.0 | 50.3 |

-continued

| Weights of the monomers | | | Time of irradiation in hours | Copolymer formed | | |
|---|---|---|---|---|---|---|
| Acrylic acid (g) | N-vinyl-carbazole (g) | Volume of toluene (cc) | | Weight (g) | % conversion | Composition (% of NVC in mols) |
| 1.381 | 3.706 | " | 4 | 0.790 | 15.5 | 49.0 |
| 1.009 | 3.993 | " | 1 | 0.053 | 1.1 | 50.0 |
| 0.472 | 4.522 | " | 3 | 0.069 | 1.4 | 49.0 |
| 0.450 | 4.744 | " | 5 | 0.043 | 0.9 | 53.7 |
| 1.703 | 2.533 | 10 | 2 | 0.092 | 2.2 | 43.8 |
| 1.322 | 3.549 | " | 2 | 0.096 | 2.0 | 49.6 |
| 1.068 | 4.226 | " | 3 | 0.118 | 2.2 | 51.2 |
| 0.584 | 5.523 | " | 5 | 0.103 | 1.7 | 51.5 |
| 0.333 | 6.197 | " | 5 | 0.048 | 0.74 | 55.7 |

EXAMPLE 3

The two starting monomers are mixed in solution in toluene at 0° C. The results of the treatment are recorded in the following Table:

| Weights of the monomers | | | Time of irradiation in hours | Copolymer formed | | |
|---|---|---|---|---|---|---|
| Acrylic acid (g) | N-vinyl-carbazole (g) | Volume of toluene (cc) | | weight (g) | % conversion | Composition (% of NVC in mols) |
| 2.018 | 2.984 | 7.05 | 2 | 0.085 | 1.7 | 47.0 |
| 1.381 | 3.710 | " | 2 | 0.065 | 1.3 | 47.3 |
| 1.009 | 3.994 | " | 2 | 0.036 | 0.7 | 53.2 |
| 0.473 | 4.522 | " | 3 | 0.026 | 0.5 | 52.0 |
| 0.250 | 4.745 | " | 5 | 0.025 | 0.5 | 48.0 |

EXAMPLE 4

The two starting monomers are mixed in solution in chloroform at 20° C. The results of the treatment are recorded in the following Table:

| Weights of the monomers | | | Time of irradiation in hours | Copolymer formed | | |
|---|---|---|---|---|---|---|
| Acrylic acid (g) | N-vinyl-carbazole (g) | Volume of chloroform (cc) | | weight (g) | % conversion | Composition (% of NVC in mols) |
| 2.018 | 2.982 | 7.05 | 1 | 0.214 | 4.3 | 47.3 |
| 1.381 | 3.707 | " | 1 | 0.212 | 4.3 | 53.9 |
| 0.473 | 4.525 | " | 2 | 0.468 | 9.4 | 57.3 |

EXAMPLE 5

The two starting monomers are mixed in solution in chloroform at 0° C. The results of the treatment are recorded in the following Table:

| Weights of the monomers | | | Time of irradiation in hours | Copolymer formed | | |
|---|---|---|---|---|---|---|
| Acrylic acid (g) | N-vinyl-carbazole (g) | Volume of chloroform (cc) | | Weight (g) | % conversion | Composition (% of NVC in mols) |
| 1.7027 | 2.5227 | 7.6 | 0.5 | 0.1988 | 4.7 | 46.0 |
| 1.322 | 3.5441 | " | 0.5 | 0.2166 | 4.3 | 48.0 |
| 1.0681 | 4.2266 | " | 1.0 | 0.4638 | 8.8 | 50.0 |
| 0.5844 | 5.5214 | " | 0.5 | 0.2473 | 4.05 | 48.5 |
| 0.3331 | 6.1991 | " | 0.5 | 0.2380 | 3.6 | 50.0 |
| 0.2644 | 6.381 | " | 1.0 | 0.2998 | 4.6 | 48.0 |
| 0.1322 | 6.733 | " | 1.0 | 0.286 | 4.2 | 54.0 |

EXAMPLE 6

The two starting monomers are mixed in solution in n-hexane at 40° C. The results of the treatment are recorded in the following Table:

| Weights of the monomers | | | Time of irradiation in hours | Copolymer formed | | |
|---|---|---|---|---|---|---|
| Acrylic acid (g) | N-vinyl-carbazole (g) | Volume of n-hexane (cc) | | Weight (g) | % conversion | Composition (% of NVC in Mols) |
| 0.5476 | 0.5516 | 12.3 | 2.25 | 0.0857 | 7.8 | 46.8 |
| 0.4851 | 0.7192 | " | " | 0.0874 | 7.3 | 49.0 |
| 0.3765 | 1.0115 | " | " | 0.1006 | 7.25 | 51.9 |

, -continued

| Weights of the monomers | | | | Copolymer formed | | |
|---|---|---|---|---|---|---|
| Acrylic acid (g) | N-vinyl-carbazole (g) | Volume of n-hexane (cc) | Time of irradiation in hours | Weight (g) | % conversion | Composition (% of NVC in Mols) |
| 0.3043 | 1.2029 | '' | 2.5 | 0.1039 | 6.9 | 53.0 |
| 0.1665 | 1.5746 | '' | 2.25 | 0.0608 | 3.5 | 58.1 |

EXAMPLE 7

The two starting monomers are mixed in solution in dioxane at 20° C. The results of the treatment are recorded in the following Table:

| Weights of the monomers | | | | Copolymer formed | | |
|---|---|---|---|---|---|---|
| Acrylic acid (g) | N-vinyl-carbazole (g) | Volume of dioxane (cc) | Time of irradiation in hours | Weight (g) | % conversion | Composition (% of NVC in mols) |
| 1.322 | 3.546 | 10 | 1 | 0.112 | 2.3 | 44.4 |
| 1.068 | 4.227 | '' | 2 | 0.217 | 4.1 | 43.7 |
| 0.584 | 5.522 | '' | 3 | 0.222 | 3.6 | 46.5 |

EXAMPLE 8

The two starting monomers are mixed in solution in dioxane at 0° C. The results of the treatment are recorded in the following Table:

| Weights of the monomers | | | | Copolymer formed | | |
|---|---|---|---|---|---|---|
| Acrylic acid (g) | N-vinyl-carbazole (g) | Volume of dioxane (cc) | Time of irradiation in hours | Weight (g) | % conversion | Composition (% of NVC in Mols) |
| 1.7028 | 2.5239 | 10 | 0.5 | 0.0567 | 1.34 | 43.0 |
| 1.322 | 3.546 | '' | 2 | 0.277 | 5.7 | 42.5 |
| 1.0679 | 4.2264 | '' | 1 | 0.092 | 1.75 | 47.0 |
| 0.5844 | 5.5236 | '' | 5 | 0.4012 | 6.6 | 48.5 |

EXAMPLE 9

The two starting monomers are mixed in solution in dioxane at 60° C. The results of the treatment are recorded in the following Table:

| Weights of the monomers | | | | Copolymer formed | | |
|---|---|---|---|---|---|---|
| Acrylic acid (g) | N-vinyl-carbazole (g) | Volume dioxane (cc) | Time of irradiation in hours | Weight | % conversion | Composition (% of NVC in mols) |
| 1.322 | 3.5462 | 10 | 1 | 0.2672 | 5.5 | 44.0 |
| 1.322 | 3.5456 | '' | 0.5 | 0.1607 | 3.2 | 43.2 |
| 1.0679 | 4.2234 | '' | 1.0 | 0.2627 | 5.0 | 46.0 |
| 0.5844 | 5.5212 | '' | 1.0 | 0.1727 | 2.8 | 51.5 |

EXAMPLE 10

The two starting monomers are mixed in solution in methanol at 20° C. The results of the treatment are recorded in the following Table:

| Weights of the monomers | | | | Copolymer formed | | |
|---|---|---|---|---|---|---|
| Acrylic acid (g) | N-vinyl-carbazole (g) | Volume of methanol (cc) | Time of irradiation in hours | Weight (g) | % conversion | Composition(% of NVC in mols) |
| 0.3439 | 0.5104 | 15 | 1.5 | 0.119 | 13.9 | 56.6 |
| 0.267 | 0.7162 | '' | 1 | 0.0582 | 5.9 | 58.5 |
| 0.2339 | 0.8049 | '' | 1 | 0.0634 | 6.1 | 54.0 |

EXAMPLE 11

The two starting monomers are mixed in solution in methanol at 40° C. The results of the treatment are recorded in the following Table:

| Weights of the monomers | | Volume of methanol (cc) | Time of irradiation in hours | Copolymer formed | | |
|---|---|---|---|---|---|---|
| Acrylic acid (g) | N-vinyl-carbazole (g) | | | Weight | % conversion | Composition(% of NVC in mols) |
| 0.267 | 0.7184 | 15 | 1 | 0.0753 | 7.6 | 51.0 |
| 0.2339 | 0.8057 | " | 1 | 0.0479 | 4.6 | 55.0 |

From these various examples, it is apparent in particular that the level of conversion is higher for an undissolved mixture than for a mixture in solution and moreover that this level tends to increase with temperature, which is quite usual in this field.

As is obvious and as is moreover already apparent from the foregoing, the invention is by no means limited to those modes of application and embodiments thereof which have been more particularly considered; on the contrary, it covers all variants thereof.

We claim:

1. A copolymer made up of units of N-vinyl-carbazole alternated with units of a polymerisable ethylenically unsaturated carboxylic acid selected from acrylic acid and methacrylic acid 2. An at least semi-finished product composed of a copolymer as set forth in claim 1 cross-linked with at least one polyvalent metal ion.

3. A process for the manufacture of a copolymer which comprises the steps of forming a mixture of the monomers N-vinylcarbazole and a polymerisable ethylenically unsaturated carboxylic acid selected from acrylic acid and methacrylic acid, the molar proportion of each monomer in said mixture being from 1 to 99% of the total of said monomers, diluting said mixture in a solvent, initiating copolymerisation of said mixture, and effecting cross-linking of the resultant copolymer with the aid of at least one polyvalent metal ion.

* * * * *